Patented Nov. 13, 1945

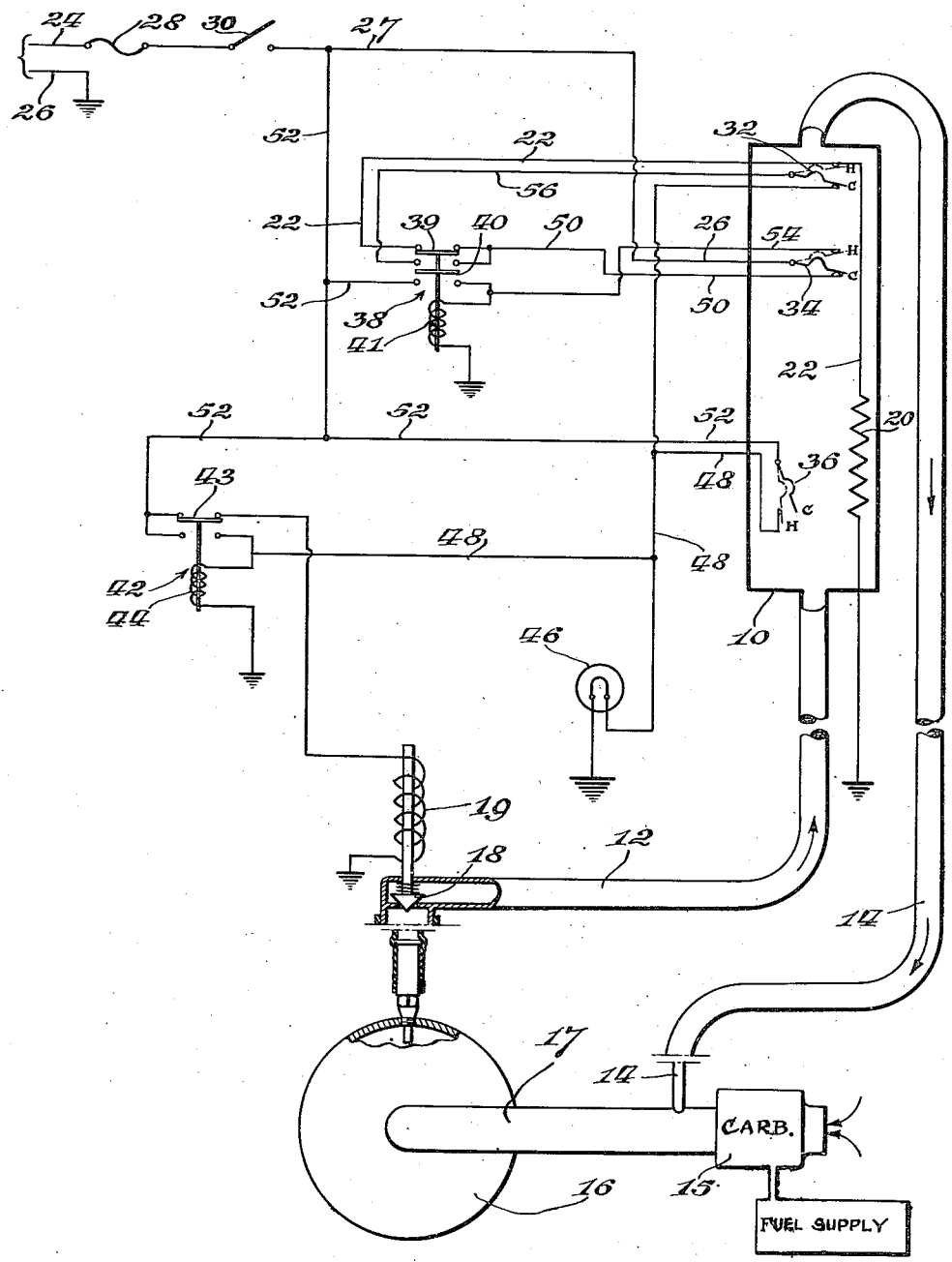

2,388,855

UNITED STATES PATENT OFFICE 2,388,855

AIRCRAFT HEATER CONTROL APPARATUS

John H. Leslie, II, Winnetka, Ill., assignor to Stewart-Warner Corporation, Chicago, Ill., a corporation of Virginia Application March 6, 1942, Serial No. 433,651

6 Claims. (Cl. 158—28)

My invention relates generally to heater control apparatus, and is more particularly concerned with the provision of an improved electrical control apparatus for aircraft heaters of the internal combustion type.

It is an object of my invention to provide an improved control circuit and apparatus whereby the supply of fuel to the heater is automatically cut off upon overheating or prolonged failure of combustion, but which will not cut off the supply of fuel upon a temporary failure of combustion.

A further object is to provide an improved heating system in which perforation or destruction of the fuel supply conduit or exhaust conduit will result in cutting off the fuel supply.

A further object is to provide an improved heating system for aircraft and the like in which an interruption in the current supply will result in cutting off the supply of fuel to the heater.

A further object is to provide an improved electrical control system for internal combustion type heaters particularly adapted for use on aircraft.

Other objects will appear from the following description, reference being had to the accompanying drawing, in which the figure is a diagram showing the improved control circuits and apparatus.

The control apparatus of my invention is adapted to be used in conjunction with heaters of the internal combustion type, such as disclosed in the co-pending application of Henry J. DeN. McCollum, Serial No. 378,262, filed February 10, 1941, which has matured into Patent No. 2,379,017.

The heater itself is indicated by the block 10 and is supplied with a combustible mixture of fuel and air through a conduit 12, and the products of combustion are discharged therefrom through a conduit 14. For purposes of illustration, the combustible mixture is shown as being supplied from the engine supercharger 16, the flow being controlled by a resiliently closed valve 18 adapted to be opened upon energization of a solenoid 19, while the discharge conduit is illustrated as connected to the intake pipe 17 located between the engine carburetor 15 and the supercharger 16. The combustible mixture supplied to the heater 10 is ignited therein by a resistance wire igniter 20 shown diagrammatically as having one terminal thereof connected to ground and its other terminal connected to a conductor 22.

The electrical control system is preferably energized from the electrical generating system of the aircraft, usually at 24 volts, through a pair of supply conductors 24, 26, the latter being indicated as connected to ground. A fuse 28 and manually operable "on-off" switch 30 are connected to the conductor 24, the switch 30, when closed, connecting the conductor 24 to a conductor 27.

In the form of the invention shown in the figure, there are three thermostatically operated switches responsive to the temperature of the heater 10, namely, an S. P. D. T. "cold switch" 32, an S. P. D. T. "igniter switch" 34, and an S. P. S. T. "overheat switch" 36. Each of these switches is shown in the drawing in its cold position. While the switches are illustrated as simple bimetal switches, in actual practice each will comprise a suitable snap type microswitch having its movable part snap-actuated by a temperature responsive bimetal, so that the various circuits controlled by these switches may be opened and closed without undue arcing at the points of contact. Furthermore, with this type of switch, there is some difference between the temperatures at which the switch opens and closes.

In addition to the thermostatically operated switches, there is provided a relay 38, having an S. P. D. T. switch 39, an S. P. S. T. switch 40, and a coil 41, and a relay 42 having S. P. D. T. switch 43 and coil 44. A warning signal lamp 46 has one terminal connected to ground and its other terminal connected to a conductor 48.

Assuming that the heater is cold and the switch 30 is closed, current will flow through the switch 30, conductor 27, and switch 34, to conductor 50, through switch 39 to conductor 22, and hence through the electrical igniter 20 to ground. Current will also flow through a conductor 52 and switch 43 to the winding 19 of the solenoid valve 18 and thence to ground, thereby causing energization of said solenoid and opening the valve 18. Thus, the combustible mixture will flow from the supercharger 16 past the valve 18, through the conduit 12, to the combustion chamber of the heater, where, after a short time, it will be ignited by the igniter 20.

As the temperature of the heater rises to a value approaching its normal operating temperature, the igniter switch 34 will snap from the position shown to its opposite position, in which it will connect conductor 26 with conductor 54, and thereby complete a circuit through the coil 41 of relay 38 to energize the latter. Upon such operation of the relay 38, its switch 39 will break the (then open) circuit between conductors 50 and 22, and make a circuit between said conductor 50 and a conductor 56, the latter being connected to the cold switch 32. Energization of the relay 38 will also result in establishing a holding circuit through the winding 41 by virtue of the closure of switch 40. It will thus be seen that the relay 38 will thereafter remain energized as long as the switch 30 remains closed.

If, after the heater has attained its normal operating temperature, its temperature should, for some unforeseen accidental condition, rise materially above its normal operating temperature, the thermostatic switch 36 will close, thus establishing a circuit from the conductor 52 to the conductor 48 and complete a circuit to the warning signal lamp 46 and to the winding of relay 42. The lamp 46 will be located in a position where the attention of the pilot or the navigator will be attracted by its illumination, and thus apprize him of the fact that the heater is not operating properly. Energization of the relay 42 will cause the switch 43 to open the circuit from the conductor 52 through the solenoid winding 19, whereupon, the valve 18 will close, under the influence of its spring, and shut off the supply of combustible mixture to the heater. Energization of the relay 42 will also establish a holding circuit through its coil 44 as well as result in connecting the conductor 48 to the conductor 52 so that the signal lamp 46 will remain illuminated, and the solenoid 19 will remain energized until the switch 30 is manually opened to deenergize the system. The heater will thus be prevented from operation even after it has cooled and the overheat switch 36 has returned to cold position.

If, after normal operation of the heater has commenced and, for some reason or other, the heater cools off, as for example, if either of the conduits 12 or 14 is perforated or severed by a bullet, the heater will rapidly cool so as to cause the thermally operated switches 32 and 34 to resume the positions in which they are shown in the drawing, the cold switch 32 being the last to return to its cold position illustrated. When the switch 32 does move to this position, it completes the following circuit: From switch 30 through conductor 27, ignition switch 34, conductor 50, switch 39, conductor 56, cold switch 32, and conductor 48 to the signal lamp 46 and the coil 44 of relay 42. Energization of the relay 42 will result in deenergization of the solenoid 19 so that the valve will close and stop the flow of the combustible mixture into the conduit 12, the signal lamp 46 indicating to the operator of the vehicle that the heater is not operating properly.

The igniter switch 34 moves from it hot position to its cold position at a higher temperature than the cold switch 32 moves from its hot to its cold position. Thus, if for any reason, the flame in the heater becomes extinguished, as by temporary interruption in the fuel mixture supply, the igniter switch will move to its cold position while the cold switch 32 is still in its hot position. Under these circumstances, current will be supplied to the igniter 20 for a short period of time through the following circuit: From switch 30 through conductor 27, igniter switch 34, conductor 50, switch 39, conductor 56, cold switch 32, a portion of the conductor 22 and igniter 20, to ground. Thus, if the interruption of the fuel supply is of a temporary character, it will, upon recommencement of flow into the heater, again be ignited by the igniter 20, and such ignition will, of course, result in a rise in temperature of the heater 20 so that the cold switch 32 will remain in its hot position and eventually the igniter switch 34 will move to its hot position and thereby deenergize the igniter 20.

However, if the interruption in the supply of fuel mixture to the heater is of extended duration, the cold switch 32 will snap to its cold position and thereby complete the previously described circuit to the signal lamp 46 and relay winding 44, completely to deenergize the heater and to cause closure of the valve 18. Thereafter, the heater can be rendered operative again only by opening the manually operated switch 30 to permit the relays 38 and 42 to resume their normal positions, and then reclosing the switch 30, whereupon, if the fault which vcaused the operation of the heater to fail has been corrected, the heater will recommence operation as initially described.

From the foregoing, it will appear that I have provided an improved control circuit and apparatus particularly useful in aircraft heating systems which is effective to assure safe operation of the system under all adverse conditions and have devised a simplified and modified circuit and apparatus which assures safe operation of the heater under most of the adverse conditions which may be encountered.

While I have shown and described a particular form of my invention, it will be apparent to those skilled in the art that numerous variations and modifications may be made without departing from the underlying principles of the invention. I therefore desire, by the following claims, to include within the scope of my invention such variations and modifications by which substantially the results of my invention may be obtained by the use of substantially the same or equivalent means.

I claim:

1. In an aircraft heating system having an internal combustion type heater provided with electrical ignition means and means to supply a fuel mixture thereto, the combination of a valve for controlling the supply of fuel mixture to the heater electromagnetic means energized to maintain said valve in open position while the heating system is in normal operation, a circuit for supplying electrical energy to said electrical igniter, a temperature responsive igniter switch in said circuit effective to open the same when the heated attains its substantially normal operating temperature and to close said circuit when the heater drops slightly below said temperature, a cold switch responsive to the temperature of said heater and operated upon attainment of a temperature lower than that required to close said igniter switch, and means controlled jointly by said cold switch and said igniter switch to deenergize said electromagnetically operated valve when both of said switches are in their cold positions.

2. The combination set forth in claim 1 in which means are provided to prevent deenergization of said electromagnetically operated valve by said cold switch until a time subsequent to the attainment of substantially normal operating temperature by said heater.

3. The combination set forth in claim 1 in which the means for deenergizing the electromagnetically operated valve includes a relay energized upon closure of said cold switch.

4. The combination set forth in claim 1 in which there is provided a temperature responsive overheat switch and means associated therewith to effect closure of said electromagnetically operated valve upon the occurrence of an overheat condition in said heater.

5. In an aircraft heating system having an internal combustion type heater provided with a combustible mixture supply conduit and means for conveying the products of combustion therefrom, a valve in said conduit, an electrical igniter in said heater, electromagnetic means for operating said valve, said means maintaining said valve open while the heating system is in normal operation, means supplying energizing current to said igniter including a thermal igniter switch, a thermal cold switch, a relay having a holding circuit, a circuit completed by said igniter switch when the temperature of said heater drops below a predetermined value to energize said relay and thereby establish its holding circuit, a switch closed upon energization of said relay, and a circuit including said relay-closed switch and said cold switch and operable upon completion to effect closure of said valve by deenergizing said electromagnetic means.

6. In an aircraft heating system, the combination of an internal combustion type heater including means for supplying a combustible mixture thereto and for withdrawing the products of combustion therefrom, a valve for controlling the flow of combustible mixture to said heater, electromagnetic means for maintaining said valve open while the system is in normal operation, an igniter switch, a cold switch, an electrically energized igniter for igniting the fuel in said heater, temperature responsive means for operating said switches, the temperature responsive means for said cold switch operating at lower temperatures than the temperature responsive means for said igniter switch, means for rendering said cold switch ineffective as the temperature of said heater increases from room temperature to its normal operating temperature, electrical means controlled by said igniter switch to render said cold switch effective, means to lock said last named means in position rendering said cold switch effective, and means operated by said cold switch upon a decrease in temperature of said heater substantially below its normal operating temperature to effect closure of said valve through deenergization of said electromagnetic means.

JOHN H. LESLIE, II.